US012165084B2

United States Patent
Grotelueschen et al.

(10) Patent No.: US 12,165,084 B2
(45) Date of Patent: *Dec. 10, 2024

(54) MEDIA DEVICE ON/OFF DETECTION USING RETURN PATH DATA

(71) Applicant: The Nielsen Company (US), LLC, New York, NY (US)

(72) Inventors: Michael Grotelueschen, Chicago, IL (US); Michael Evan Anderson, Chicago, IL (US); Fatemehossadat Miri, Chicago, IL (US); Demetrios Fassois, Chicago, IL (US); Tushar Chandra, Chicago, IL (US); David J. Kurzynski, South Elgin, IL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/336,728

(22) Filed: Jun. 16, 2023

(65) Prior Publication Data

US 2023/0334352 A1    Oct. 19, 2023

Related U.S. Application Data

(63) Continuation of application No. 16/698,167, filed on Nov. 27, 2019, now Pat. No. 11,727,292.

(Continued)

(51) Int. Cl.
*G06Q 10/00*      (2023.01)
*G06F 16/22*      (2019.01)
(Continued)

(52) U.S. Cl.
CPC .......... *G06N 7/01* (2023.01); *G06F 16/2228* (2019.01); *G06F 16/285* (2019.01); *G06N 5/01* (2023.01);
(Continued)

(58) Field of Classification Search
None
See application file for complete search history.

(56) References Cited

U.S. PATENT DOCUMENTS

2013/0074129 A1* 3/2013 Reisman .............. H04N 21/858
725/112
2014/0380349 A1   12/2014 Shankar et al.
(Continued)

FOREIGN PATENT DOCUMENTS

EP           1646169 A1    4/2006
KR        20190036422 A    4/2019
(Continued)

OTHER PUBLICATIONS

Alsop,Pat,SpotTVAdvertisers:UnderstandingNielsen'sMeasuremen tUpdates, Feb. 13, 2018,MediaAudit,https://www.mediaaudit.com/post/spot-tv-advertisers-understanding-nielsens-measurement-updates,p. 1-10. (Year: 2018).*

(Continued)

*Primary Examiner* — Joseph M Waesco

(57) ABSTRACT

An example apparatus to perform media device on/off detection using return path data includes interface circuitry, machine readable instructions, and programmable circuitry to at least one of instantiate or execute the machine readable instructions to classify view segments associated with common homes data based on whether first return path data in respective ones of the view segments has matching panel meter data to determine labeled view segments, train a machine learning algorithm, based on a first set of features, to output media device on/off determinations to produce a machine learning algorithm, the first set of features generated from the labeled view segments, and apply second return path data to the machine learning algorithm trained to (Continued)

output a first on/off determination associated with a media device represented in the second return path data.

20 Claims, 7 Drawing Sheets

Related U.S. Application Data

(60) Provisional application No. 62/863,131, filed on Jun. 18, 2019.

(51) Int. Cl.
| | | |
|---|---|---|
| *G06F 16/28* | (2019.01) | |
| *G06N 5/01* | (2023.01) | |
| *G06N 7/01* | (2023.01) | |
| *G06N 20/20* | (2019.01) | |
| *G06Q 30/0201* | (2023.01) | |

(52) U.S. Cl.
CPC ......... *G06N 20/20* (2019.01); *G06Q 30/0201* (2013.01)

(56) References Cited

U.S. PATENT DOCUMENTS

| | | | |
|---|---|---|---|
| 2015/0135206 A1* | 5/2015 | Reisman | H04H 20/93 725/18 |
| 2015/0143395 A1* | 5/2015 | Reisman | H04N 21/47202 725/14 |
| 2015/0358667 A1* | 12/2015 | Bhatia | H04N 21/4222 725/14 |
| 2016/0088333 A1* | 3/2016 | Bhatia | H04N 21/812 725/34 |
| 2016/0323616 A1 | 11/2016 | Doe | |
| 2017/0011105 A1* | 1/2017 | Shet | G06Q 30/06 |
| 2017/0332121 A9* | 11/2017 | Bhatia | G06Q 30/0267 |
| 2017/0353764 A1 | 12/2017 | Kurzynski et al. | |
| 2018/0146250 A1* | 5/2018 | Cui | H04N 21/25891 |
| 2018/0152762 A1 | 5/2018 | Sullivan et al. | |
| 2018/0192095 A1* | 7/2018 | Eldering | H04N 21/44204 |
| 2018/0310034 A1* | 10/2018 | Perez | H04N 21/4622 |
| 2018/0376198 A1 | 12/2018 | Sheppard et al. | |
| 2019/0058878 A1 | 2/2019 | Nielsen | |
| 2019/0110095 A1* | 4/2019 | Perez | H04N 21/6125 |
| 2019/0158916 A1 | 5/2019 | Shankar et al. | |
| 2019/0378034 A1* | 12/2019 | Mowrer | H04N 21/6582 |
| 2020/0328955 A1* | 10/2020 | Kurzynski | H04H 60/66 |
| 2020/0401919 A1* | 12/2020 | Grotelueschen | G06F 16/285 |

FOREIGN PATENT DOCUMENTS

| | | |
|---|---|---|
| WO | 2021041909 A1 | 3/2021 |
| WO | 2021150944 A1 | 7/2021 |

OTHER PUBLICATIONS

European Patent Office, "Supplementary European Search Report," issued in connection with EP 20825728.7, dated Mar. 17, 2023, 2 pages.

European Patent Office, "European Search Opinion," issued in connection with EP 20825728.7, dated Mar. 27, 2023, 10 pages.

Sanchez et al., "ZSim: Fast and Accurate Microarchitectural Simulation of Thousand-Core Systems," ACM SIGARCH Computer Architecture News, Jun. 2013, 12 pages.

Clark et al., "Who's Watching TV?," New York University—Stern School of Business, dated Oct. 24, 2016, 37 pages.

International Searching Authority, "Written Opinion of the International Searching Authority," issued in connection with International Patent Application No. PCT/US2020/037929, dated Sep. 25, 2020, 4 pages.

International Searching Authority, "International Search Report," issued in connection with International Patent Application No. PCT/US2020/037929, dated Sep. 25, 2020, 3 pages.

International Bureau, "International Preliminary Report on Patentability," issued in connection with International Patent Application No. PCT/US2020/037929, dated Dec. 30, 2021, 6 pages.

United States Patent and Trademark Office, "Non-Final Office Action," issued in connection with U.S. Appl. No. 16/698,167, dated May 2, 2022, 11 Pages.

United States Patent and Trademark Office, "Final Office Action," issued in connection with U.S. Appl. No. 16/698,167, dated Aug. 23, 2022, 12 Pages.

United States Patent and Trademark Office, "Notice of Allowance" issued in U.S. Appl. No. 16/698,167 on Mar. 8, 2023 (8 pages).

United States Patent and Trademark Office, "Notice of Allowance" issued in U.S. Appl. No. 16/698,167 on Jul. 13, 2023 (2 pages).

* cited by examiner

| Broadcast Service #1 | | |
|---|---|---|
| On/Off Model | Extra Tuning % Removed | Matched Tuning % Removed |
| Prod | 43 | 21 |
| New | 52 | 15 |
| Broadcast Service #2 | | |
| On/Off Model | Extra Tuning % Removed | Matched Tuning % Removed |
| Prod | 70 | 25 |
| New | 71 | 12 |
| Broadcast Service #3 | | |
| On/Off Model | Extra Tuning % Removed | Matched Tuning % Removed |
| Prod | 78 | 36 |
| New | 75 | 18 |

FIG. 5A

| Household Ratings | Currency | Prior On/Off Model | New On/Off Model | Prior vs. Currency | New vs. Currency |
|---|---|---|---|---|---|
| Set Meter | 43.5 | 42.9 | 43.7 | -0.6 | 0.2 |
| Code Reader | 44.7 | 43 | 44 | -1.6 | -0.7 |
| Persons Ratings | | | | | |
| Demographic (Set Meter) | Currency | Prior On/Off Model | New On/Off Model | Prior vs. Currency | New vs. Currency |
| P18-24 | 25.9 | 22.5 | 23 | -3.4 | -2.9 |
| P25-54 | 38.4 | 35.1 | 35.7 | -3.3 | -2.7 |
| P55+ | 39.1 | 38.5 | 39.1 | -0.6 | 0 |
| Demographic (Code Meter) | Currency | Prior On/Off Model | New On/Off Model | Prior vs. Currency | New vs. Currency |
| P18-24 | 25.7 | 22.5 | 23 | -3.2 | -2.7 |

FIG. 5B

MEDIA DEVICE ON/OFF DETECTION USING RETURN PATH DATA

CROSS REFERENCE TO RELATED APPLICATIONS

This patent arises from a continuation of U.S. patent application Ser. No. 16/698,167, now U.S. Pat. No. 11,727,292, filed on Nov. 27, 2019, which claims the benefit of and priority to U.S. Provisional Application No. 62/863,131, filed on Jun. 18, 2019. U.S. patent application Ser. No. 16/698,167 and U.S. Provisional Application No. 62/863,131 are incorporated herein by reference in their entirety.

FIELD OF THE DISCLOSURE

This disclosure relates generally to on/off detection of media devices and, more particularly, to media device on/off detection using return path data.

BACKGROUND

Set-top boxes (STBs) in cable and satellite subscribers' homes access second-by-second subscriber viewing data, including a user's television tuning data. Viewing data can include programs watched by subscribers, while tuning data can include locations of subscriber households, changes of a channel, the times at which programs are accessed, etc. STBs report return path data (RPD), which includes such television tuning and viewing data, back to multi-channel video programming distributor providers (e.g., cable and satellite providers).

BRIEF DESCRIPTION OF THE DRAWINGS

FIGS. 5A-5B include example validation metrics indicating that an example machine learning algorithm training in accordance with teachings of this disclosure can result in improved accuracy when compared to a reference common homes tuning method.

The figures are not to scale. In general, the same reference numbers will be used throughout the drawing(s) and accompanying written description to refer to the same or like parts, elements, etc.

Figure 1:
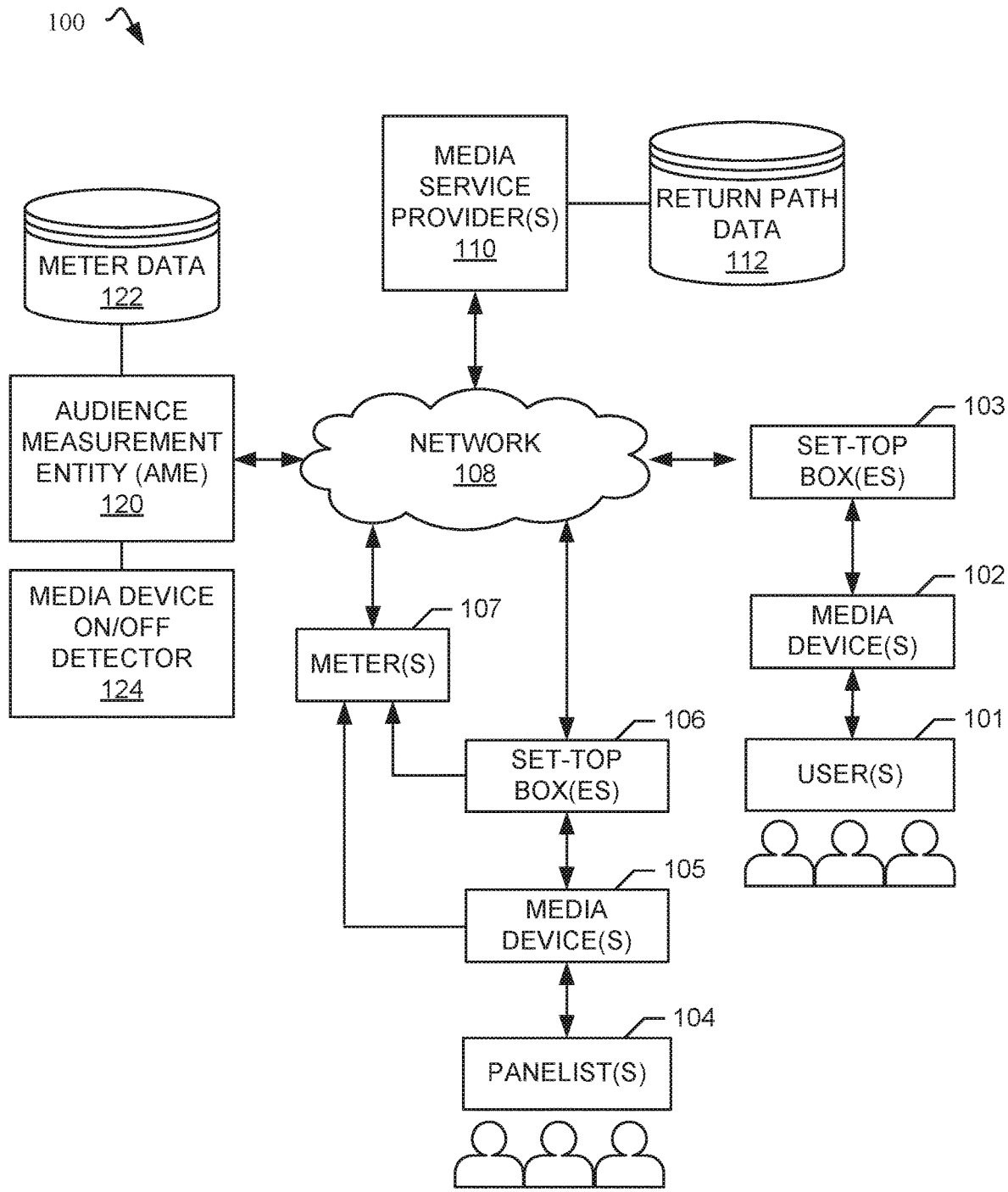
FIG. 1 is a block diagram illustrating an example operating environment in which a media device on/off detector implements media device on/off detection using return path data in accordance with teachings of this disclosure.

Descriptors "first," "second," "third," etc., are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example technical solutions to perform media device on/off detection using return path data are disclosed. Such example technical solution may include one or more of methods, apparatus, systems, articles of manufacture (e.g., physical storage media), etc., to perform media device on/off detection using return path data in accordance with teachings of this disclosure.

Many home entertainment systems include a set-top box (STB) to receive media from a service provider and display the media on a media device, such as television. Examples of service providers include cable television providers, satellite television providers, over-the-top (OTP) service providers, Internet service providers, etc. Audience measurement entities (AMEs), such as The Nielsen Company (US), LLC, monitor the viewing of media presented by such media devices. For example, an AME may extrapolate ratings metrics and/or other audience measurement data for a total television viewing audience from a relatively small sample of panel homes. The panel homes may be well studied and are typically chosen to be representative of an audience universe as a whole. However, accurately representing the geographic distribution and demographic diversity that exists in the total audience population with a small sample of panel homes remains a challenge. Incorporating additional streams of information about media exposure to the total audience population can fill in gaps or biases inherent to any statistical sample.

To help supplement panel data, an AME, such as The Nielsen Company (US), LLC, may reach agreements with pay-television provider companies to obtain the television tuning information derived from the STBs and/or other devices/software, which is referred to herein, and in the industry, as return path data. STB data includes all the data collected by the STB. STB data may include, for example, tuning data relating to tuning events and/or commands received by the STB (e.g., power on, power off, change channel, change input source, record a presentation of media, volume up/down, etc.). The STB data can also include viewing data, relating to the type of media content accessed by the user (e.g., an advertisement, a movie, etc.) and the time of day the media content was accessed (e.g., the time/date a media presentation was started, the time a media presentation was completed, when a media presentation was paused, etc.). STB data may additionally or alternatively include commands sent to a content provider by the STB (e.g., switch input sources, record a media presentation, delete a recorded media presentation, etc.), heartbeat signals, or the like. The STB data may additionally or alternatively include a household identification (e.g. a household ID) and/or a STB identification (e.g. a STB ID).

Return path data includes any data receivable at a media service provider (e.g., such as a cable television service provider, a satellite television service provider, a streaming media service provider, a content provider, etc.) via a return path to the service provider from a media consumer site. As such, return path data includes at least a portion of the STB data. Return path data may additionally or alternatively include data from any other consumer device with network access capabilities (e.g., via a cellular network, the internet, other public or private networks, etc.). For example, return path data may include any or all of linear real time data from an STB, guide user data from a guide server, click stream data, tuning data associated with key stream data (e.g., any click on the remote-volume, mute, etc.), viewing data associated with interactive activity (such as Video On Demand) and any other additional data (e.g., data from middleware). RPD data can additionally or alternatively be from the network (e.g., via Switched Digital software) and/or any cloud-based data (such as a remote server DVR) from the cloud.

RPD can provide insight into the media exposure associated with a larger segment of the audience population. However, RPD may not directly provide information concerning the media device(s) connected to the STB reporting the RPD, such as the on/off operating state of a media device connected to the STB. Determining the operating state of the media device connected to the STB can be important to accurately credit exposure associated with media output from the STB. For example, a media device connected to the STB can be turned off while the STB remains inadvertently or intentionally powered on and outputting media. For example, while a television may be turned off, the STB remains on, given that about 10% of STBs are never turned off for over a month (e.g., approximately 30% of STBs remain on for a 24 hour period on any given day). In such examples, knowledge of the operating state of the media device can help an AME accurately credit whether media output from the STB is actually being presented by the media device.

Example technical solutions disclosed herein predict the on/off operating state of a media device connected to a STB from RPD reported by that STB. Disclosed example technical solutions leverage common homes data to train one or more machine learning algorithms, such as a random-forest, a neural network, etc., to predict the operating state of media devices connected to STBs from features extracted from RPD reported from those STBs. Common home data refers to panel homes (i) that are monitored by an AME using one or more meters and (ii) that also have STBs that report RPD that is received by the AME (e.g., either directly or indirectly from the service provider of the STBs). The audience measurement entity meter data obtained by the AME for common homes yields a truth set of viewing data that identifies the media being presented in each of the common panel homes and, thus, reflects the operating states of monitored media devices and STBs in those homes over a monitoring period. The meter data for each common home is then linked to the RPD from that same home to yield training RPD that either has matching panel meter viewing data, which indicates the media device in that common home was on, or that doesn't have any matching meter viewing data, which indicates the media device in that common home was off (e.g., because the STB is reporting RPD, but the panel meter did not report any corresponding viewing data). The training RPD is used to train the machine learning algorithm to predict whether the training RPD for a given common home has matching meter data (corresponding to a media device on state) or does not have matching meter data (corresponding to a media device off state). Disclosed example technical solutions then employ the trained machine learning algorithm to process RPD reported from an STB to predict whether a media device connected to that STB is on or off.

FIG. 1 is a block diagram illustrating an example operating environment in which a media device on/off detector implements media device on/off detection using return path data in accordance with teachings of this disclosure. The example operating environment 100 of FIG. 1 includes example user(s) 101, example media device(s) 102, and example set-top box(es) (STBs) 103 associated with the user(s) 101. In the illustrated example, the user(s) 101 are not AME panelists. The example operating environment 100 of FIG. 1 also includes example panelist(s) 104, example media device(s) 105, and example set-top box(es) (STBs) 106 associated with the panelist(s) 104. The operating environment 100 further includes example meter(s) 107 to collected data from media device(s) 105 and/or STBs 106, an example network 108, example media service provider(s) 110, and an example audience measurement entity (AME) 120. The example media service provider(s) 110 includes example return path data storage 112. The example audience measurement entity (AME) includes examples meter data 122 and an example media device on/off detector 124.

The user(s) 101 include any individuals who access media content on one or more media device(s) 102 and who are not associated and/or registered with an AME 120 panel (e.g., do not have AME-based meter(s) 107). The user(s) 101 include individuals who are subscribers to services provided by media service provider(s) 110 and utilize these services via their media device(s) 102.

The media device(s) 102 associated with the non-panelists user(s) 101 can be stationary or portable computers, handheld computing devices, smart phones, Internet appliances, and/or any other type of device that may be capable of presenting media from media service provider(s) 110. In the illustrated example of FIG. 1, the media device(s) 102 may include, for example, a television, a tablet (e.g., an Apple® iPad™, a Motorola™ Xoom™, etc.), a desktop computer, a camera, an Internet compatible television, a smart TV, etc. The media device(s) 102 of FIG. 1 are used to access (e.g., request, receive, render and/or present) media provided, for example, by media service provider(s) 110 through the example network 108.

The STB(s) 103 associated with media device(s) 102 can include, for example, a STB associated with a home entertainment system. The home entertainment system can receive media from the media service provider(s) 110 and display the media on the media device(s) 102 (e.g., television, etc.). STB data includes some or all of the data collected by a given STB 103, including tuning events and/or commands received by the STB 103 (e.g., power on, power off, change channel, change input source, start presenting media, pause the presentation of media, record a presentation of media, volume up/down, etc.). The STB data may additionally or alternatively include commands sent to the media service provider(s) 110 by the STB 103 (e.g., switch input sources, record a media presentation, delete a recorded media presentation, the time/date a media presentation was started, the time a media presentation was completed, etc.), heartbeat signals, or the like. The STB data can include a household identification (e.g. a household ID) and/or a STB identifier (e.g. a STB ID) for the STB 103.

Panelist(s) 104 include users who are part of an AME panel home, such that the user's access and/or exposure to media creates a media impression (e.g., viewing of an advertisement, a movie, etc.). For example, the panelist(s) 104 can include users who have provided their demographic information when registering with the example AME 120. When the example panelist(s) 104 utilize example media devices 105 to access media through the example network 108, the AME 120 (e.g., AME servers) stores panelist activity data associated with their demographic information (e.g., in panel home meter data 122) via one or more meter(s) 107.

The media device(s) 105 associated with the panelist(s) 104 can be stationary or portable computers, handheld computing devices, smart phones, Internet appliances, and/or any other type of device that may be capable of presenting media from media service provider(s) 110. In the illustrated example of FIG. 1, the media device(s) 105 may include, for example, a television, a tablet (e.g., an Apple® iPad™, a Motorola™, Xoom™, etc.), a desktop computer, a camera, an Internet compatible television, a smart TV, etc. The media device(s) 105 of FIG. 1 are used to access (e.g., request, receive, render and/or present) media provided, for example, by media service provider(s) 110 through the example network 108. The media device(s) 105 can interact with the meter(s) 107 to provide viewing data to the AME 120 (e.g., programs the panelist(s) were exposed to using media device(s) 105).

The STB(s) 106 associated with media device(s) 105 can include, for example, a STB associated with a home entertainment system. The home entertainment system can receive media from the media service provider(s) 110 and display the media on the media device(s) 105 (e.g., television, etc.). STB data includes some or all of the data collected by a given STB 106, including tuning events and/or commands received by the STB 106 (e.g., power on, power off, change channel, change input source, start presenting media, pause the presentation of media, record a presentation of media, volume up/down, etc.). The STB data may additionally or alternatively include commands sent to the media service provider(s) 110 by the STB 106 (e.g., switch input sources, record a media presentation, delete a recorded media presentation, the time/date a media presentation was started, the time a media presentation was completed, etc.). The STB data can include a household identification (e.g. a household ID) and/or a STB identifier (e.g. a STB ID) for the STB 106. The STB 106 can also interact with the meter(s) 107 to provide STB data (e.g., tuning data and/or viewing data) directly to the meter(s) 107.

The meter(s) 107 include hardware and/or software provided by the AME 120 when or after panelist(s) 104 associated with the media device(s) 105 agree to be monitored. In the example of FIG. 1, the meter(s) 107 collect monitoring information such as media device-panelist interaction, content accessed on the media device, media device status, user selection, user input, location information, image information, etc. Periodically and/or aperiodically, the meter(s) 107 transmit the monitoring information to the AME server (e.g., AME 120). The meter(s) 107 can also collect information from the STB(s) 106 that can include tuning data and/or viewing data in order to transmit such data to the AME 120. In this context, given that the meter(s) 107 can provide both media device-based data and STB-based data (e.g., using media device(s) 105 and STB(s) 106), the panelist(s) 104 are part of a panel home that is herein referred to as a common home, indicating that the panel home is not only monitored by the AME 120 using meter(s) 107, but also includes STB(s) 106 that report return path data which is subsequently received by the AME 120.

The network 108 may be implemented using any suitable wired and/or wireless network(s) including, for example, one or more cable provider networks, one or more satellite provider networks, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events. Audience measurement entities (AMEs), such as The Nielsen Company (US), LLC, monitor the viewing of media presented by such media devices.

The media service provider(s) 110 can include cable television service provider, satellite television service provider, a streaming media service provider, over-the-top (OTP) service provider, Internet service provider, a content provider, etc. The media service provider(s) 110 can include a database storing return path data (e.g., return path data 112) received from the STB 106. For example, the return path data 112 can include any data receivable at media service provider(s) 110 via a return path to the media service provider(s) 110 from a media consumer site. For example, return path data 112 can include at least a portion of the STB data from the STB(s) 103 and/or the STB data from the STB(s) 106. Return path data 112 can also include data from any other consumer device with network access capabilities (e.g., via a cellular network, the internet, other public or private networks, etc.). For example, return path data 112 can include any or all of linear real time data from the STB(s) 103 and/or STB(s) 106, guide user data from a guide server, click stream data, key stream data (e.g., any click on the remote-volume, mute, etc.), interactive activity (such as Video On Demand) and any other data (e.g., data from middleware). Return path data 112 can be received from the STB(s) 103 and/or STB(s) 106 via the network 108 (e.g., via Switched Digital software) and/or can be cloud-based data (such as associated with a remote server DVR) received from a cloud service (e.g., via a return path data cloud service that collects, processes, and analyzes the cloud-based data).

The AME 120, such as The Nielsen Company (US), LLC, operates as an independent party to measure and/or verify audience measurement information relating to media accessed by subscribers. The AME 120 can reach agreements with pay-television provider companies (e.g., media service provider(s) 110) to obtain television tuning information (e.g., return path data 112) derived from STB(s) 103 and/or STB(s) 106 and/or other devices/software. This permits the AME 120 to augment panelist data (e.g., tuning and/or viewing data collected from panelist(s) 104) with non-panelist data (e.g., tuning and/or viewing data collected from the STB(s) 106 associated with the user(s) 101). In some examples, the AME 120 utilizes common homes data to enable combining of the return path data 112 with the meter data 122. Common homes data refers to panel homes (e.g., homes of panelist(s) 104) that are monitored by an AME (e.g., AME 120) using one or more meters (e.g., meter(s) 107) and that also have STBs (e.g., STB(s) 106) that report return path data (e.g., return path data 112) that is received by the AME 120 (e.g., either directly or indirectly from the media service provider(s) 110 of the STB(s) 106).

The meter data 122 includes meter data obtained by the AME 120 for common homes (e.g., homes that have AME panelist(s) 104 and provide return path data 112 to the media service provider(s) 110), as well as meter data obtained from homes that include an AME-based meter but do not include a STB. As such, the meter data 122 is collected from various meters (e.g., a people meter, etc.) that are used as audience measurement tools to measure viewing habits of, for example, television and cable audiences (e.g., panelist(s) 104). Meter data can include, for example, demographic information of the media viewer (e.g., panelist(s) 104) and their viewing status (e.g., media content being watched by the panelist(s) 104). In the example of FIG. 1, the meter data 122 can be used by the AME 120 to yield a truth set of viewing data that identifies the media being presented in common panel homes to reflect the operating states of monitored media devices (e.g., media device(s) 105) and STBs (e.g., STB(s) 106) in such homes over a monitoring period using the media device on/off detector 124.

The media device on/off detector 124 links panel meter data 122 for each common home (e.g., home with panelist(s) 104 that provides return path data 122 via the STB(s) 106) to the return path data 112 from the same home. The media device on/off detector 124 uses the linked information to create a return path data set used for training a machine-learning algorithm, as detailed in connection with FIGS. 2-3. For example, the media on/off detector creates a training return path data set that includes (1) matching panel meter viewing data 122 (e.g., indicating media device(s) 105 in the common home was turned on), and/or (2) no matching panel meter viewing data 122 (e.g., indicating media device(s) 105 were turned off), as described in connection with FIG. 2. The training return path data generated by the media device on/off detector 124 trains the machine learning algorithm to predict if return path data 112 has or does not have matching meter data 122, thereby the media device on/off detector 124 uses this information to determine whether the media device(s) 105, connected to the STB(s) 106, were turned on or off. The media device on/off detector 124 can then use the trained algorithm to evaluate data received from STBs that are not associated with common homes (e.g., the STB(s) 103), such that the media device(s) 102 can be determined to have been either on or off during a specific viewing event (e.g., viewing of a particular channel). This allows the AME 120 to determine, using the media device on/off detector 124, whether data for a particular viewing event is in fact associated with the media device 102 being turned on, or whether the STB 103 was turned on while the media device 102 was turned off, in which case the viewing event is not a true viewing segment that can be used for purposes of obtaining audience measurement data. As such, the media device on/off detector 124 applies the machine learning algorithm, after it has been trained using the common homes data (e.g., data from panelist(s) 104 providing both meter data from the meter(s) 107 and return path data from the STB(s) 106), to the homes that do not include panelists but do have user(s) 101 associated with STB(s) 103 providing return path data that can be identified as reporting a true viewing event (e.g., media device 102 determined to be on) or reporting a viewing event that is not a true viewing event (e.g., media device 102 determined to be off while the STB 103 was left on).

Figure 2:
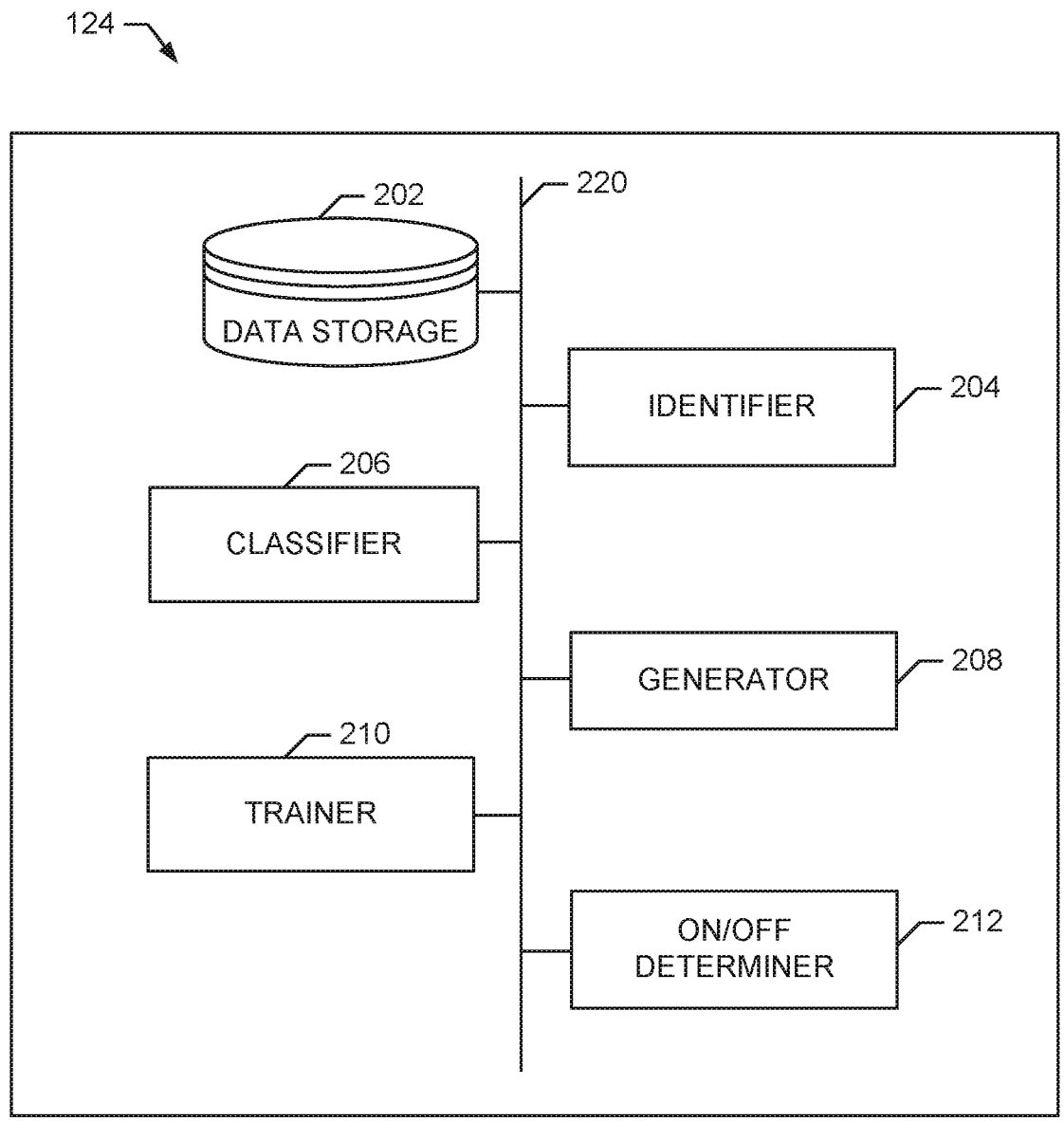
FIG. 2 is a block diagram of an example implementation of the media device on/off detector of FIG. 1.

FIG. 2 is a block diagram of an example implementation of the media device on/off detector 124. The media device on/off detector 124 includes example data storage 202, an example identifier 204, an example classifier 206, an example generator 208, an example trainer 210, and an example on/off determiner 212.

The data storage 202 stores return path data 112 and meter data 122 for media device(s) 105, as well as return path data associated with media device(s) 102. For example, the data storage 202 stores data retrieved from the media service provider(s) 110 (e.g., return path data 112) and data available to the AME 120 (e.g., panel meter data 122). For example, data retrieved from the media service provider(s) 110 can include at least a portion of the STB 103 and/or STB 106 data and/or data from any other consumer device with network access capabilities (e.g., via a cellular network, the internet, other public or private networks, etc.). In some examples, this data can include linear real time data from the STB(s) 103 and/or STB(s) 106, guide user data from a guide server, click stream data, key stream data (e.g., any click on the remote-volume, mute, etc.), interactive activity (such as Video On Demand) and any other data (e.g., data from middleware). Data stored by the data storage 202 can include panel meter data 122, such as demographic information of the media viewer (e.g., panelist(s) 104) and their viewing status (e.g., media content being watched by the panelist(s) 104). In some examples, the data storage 202 data includes data retrieved for common homes (e.g., homes with panelist(s) 104 who are both AME 120 panelists and have a STB 106 that provides return path data 112 to the media service provider(s) 110). In some examples, such data can include panel meter data 122 derived from set-meter (SM) and code reader (CR) panels, and/or data from National People Meters (NPM) (e.g., an audience measurement entity reader or an audience measurement entity meter 107). In such examples, the return path data 112 and panel meter data 122 derived from the common homes (e.g., homes with media device(s) 105) can be used to train a machine learning algorithm using panel meter data (e.g., data from meter(s) 107) as a truth set such that the algorithm is trained to recognize whether the media device(s) 105 are on or off. Once the algorithm is trained, it can be used to determine whether the media device(s) 102 are turned on or off (e.g., using return path data from STB(s) 103 associated with non-panel homes) to identify true viewing events and/or viewing segments. As such, the status of a media device 102 (e.g., on/off) that is associated with a non-panel home (e.g., home of user(s) 101) can be inferred using the machine learning algorithm trained on the common homes data (e.g., data from STB(s) 106 and meter(s) 107).

The non-panel home return path data thereby supplements existing panel meter data 122 to increase sample size and representative panel foundation per market (e.g., increase the number of households (HH) that can be included in audience measurement-based data reports). For example, adding the return path data (RPD) 112 can reduce the number of zero-rated quarter hours (QHs) in AME 120-based data (e.g., reduce the number of times of day and networks for which no panelist-based viewing data 122 is available). The data storage 202 may be implemented by any storage device and/or storage disc for storing data such as, for example, flash memory, magnetic media, optical media, etc. Furthermore, the data stored in the data storage 202 may be in any data format such as, for example, binary data, comma delimited data, tab delimited data, structured query language (SQL) structures, etc. While in the illustrated example the data storage 202 is illustrated as a single database, the data storage 202 can be implemented by any number and/or type(s) of databases.

The identifier 204 can access common homes data from the data storage 202 (e.g., return path data 112 from STB(s) 106 that are also monitored by AME meter(s) 107, as well as panel meter data 122 from meter(s) 107) for one or more groups of common homes. In some examples, the identifier 204 groups the common homes data into view segments (e.g., quarter hour segments). The view segments can correspond to specific view times (e.g., Monday-Friday, between 4 am and 5 am) when panelist(s) 104 viewed media provided by media service provider(s) 110. In some examples, the groups of common homes can include homes that are within a specific geographic region of interest (e.g., identified by the same zip code). The identifier 204 can group the common homes in any way that is of interest to the assessment of data relevant for improving market coverage and persons audience estimates (e.g., improving representation of a local market). In some examples, the identifier 204 also identifies additional data available from the panel meter data 122, such as viewers for the tuning events, household characteristics and compositions derived from household tuning (e.g., via STB 106), third-party (e.g., media service provider(s) 110) data, and known panel information (e.g., meter data 122). In some examples, the identifier 204 compares the panel meter data 122 and return path data 112 tuning for each common home. In some examples, such a comparison can include minute-level comparison of tuning for each set of data (e.g., RPD 112 and panel meter data 122) for each of the common homes.

The classifier 206 classifies the view segments (e.g., quarter hour segments) identified using the identifier 204 based on whether the RPD 112 for respective ones of the view segments has matching panel meter data 122 to determine labeled view segments. For example, the classifier 206 can classify view segments as "matched" or "extra" to determine labeled view segments. In such examples, a given view segment can be classified as "matched" if the RPD 112 data (e.g., tuning data) for the view segment has matching panel meter data 122 (e.g., viewing data) for the view segment. For example, a match can occur when the same tuning event is determined to have occurred for both the RPD 112 and the panel meter data 122 (e.g., return path data 112 from STB 106 indicates that a particular channel was tuned for a total of 3 hours, and panel meter data 122 from meter 107 confirm this channel was in fact active and presenting media at the sites of the panelist(s) 104 for the full 3 hours). In some examples, the classifier 206 classifies a view segment as "extra" if the RPD 112 tuning data in the view segment does not have matching viewing data from the panel meter data 122. In some examples, the classifier 206 classifies some view segments as partially "matched" or partially "extra". For example, return path data 112 can indicate that a channel was tuned for 3 hours, but panel meter data 122 indicates that the channel was active and presenting media at the sites of the panelist 104 for 1.5 hours out of the 3 hours reported by the return path data 122 from STB 106, such that some of the view segments are classified as "matched" when the panel meter data 122 corresponds to return path data 112, while other view segments are classified as "extra" when the panel meter data 122 does not correspond to return path data 112. In some examples, the classifier 206 classifies partially "matched" and partially "extra" view segments as "matched" view segments. For example, a partially "matched" and/or partially "extra" view segment (e.g., a 30 minute long view segment) can be classified as "matched" when most (e.g., at or exceeding a first threshold) of the view segment (e.g., 20 minutes out of a 30 minutes long view segment) is "matched" using both the return path data 112 and meter data 122. In some examples, a partially "extra" and/or partially "matched" view segment (e.g., a 30 minute long view segment) can be classified as "extra" when most (e.g., at or below a second threshold) of the view segment (e.g., 20 minutes out of a 30 minutes long view segment) does not include a match between return path data 112 and meter data 122. In some examples, the classifier 206 classifies partially "matched" and partially "extra" view segments as "extra" view segments.

The generator 208 generates features from the labeled view segments (e.g., "matched" and/or "extra" view segments). For example, the generator 208 can generate features from labeled view segments of the common homes data to create training data for purposes of training a machine learning algorithm using the training data. For example, features generated by the generator 208 using the labeled view segments can include, but are not limited to: a day of the month, a view segment index (e.g., "viewsegment index" corresponding to where in the event the view segment occurs), a view segment duration (e.g., "viewsegment duration") corresponding to the length of time of a given view segment, an event duration corresponding to the length of time specific media content was viewed, number of minutes since event start, a day of week, weekday/weekend, STB model type, timezone, event type (e.g., live viewing, time-shifted viewing (TSV), etc.), average event duration for a specific household for a specific day, number of events a household has in a day, number of view segments a household has in a day, average event duration for a specific device for a specific day, number of events a device has in a day, number of view segments a device has in a day, the ratio of event duration to the average event duration for a device for a day, etc. In some examples, the generator 208 generates other types of features, as specified by user-based configuration or input, or as specified by a machine learning algorithm based on the training data.

The trainer 210 trains a machine learning algorithm included in the on/off determiner 212 based on features generated by the generator 208 that forms the training data. For example, the trainer 210 uses the training data to iteratively train and tune the machine learning algorithm which may be, for example, a neural network. In some examples, the machine learning algorithm can be a random forest or random decision forest learning method (e.g., supervised classification algorithm). For example, using a random forest learning method allows the input of a training dataset with targets and features into a decision tree, allowing the algorithm to formulate a set of rules that are, in turn, used to form predictions. Likewise, use of the random forest learning method allows for input of data that may be missing values. In some examples, the random forest classification algorithm can be used as the machine learning algorithm of choice in order to capture non-linear behavior of the training data and due to its ability to classify based on a wide range of parameter settings. For example, the trainer 210 can use a random forest learning method to estimate the probability that an observation falls into a given class. In some examples, the trainer 210 can use a random forests classifier to train the data (e.g., using a collection of randomly grown trees whose final prediction is an aggregation of predictions from individual trees). In some examples, once fitting of a classification random forest to training data is performed by the trainer 210, conditional class probabilities can be inferred for a test point by counting the fraction of "trees" in the "forest" that vote for a certain class. When both classifiers in a set are highly correlated, the estimated probabilities converge to 0 or 1.

In some examples, the trainer 210 utilizes one or more thresholds to transform probability values output from the machine learning algorithm into "matched" or "extra" classifications, with the threshold(s) being tuned to meet one or more performance targets. For example, choice of a probability threshold (e.g., p-value) by which to actually classify a species as "matched" or "extra" is important and may not always default to a p-value of 0.5. In some examples, an adjusted probability threshold (e.g., p-value=x) can be used to re-classify those probability values greater than x as "matched" and probability values less than x as "extra" (e.g., the threshold adjusted based on whether the machine learning algorithm correctly identifies a media device an "extra" or "matched"). For example, a probability value of 0.995 returned by a machine learning algorithm such as random forest predicts that a data set is very likely to be "matched" (e.g., all of the RPD 112 data (e.g., tuning data) in the view segment has matching panel meter data 122). Conversely, a probability value of 0.004 predicts that a data set is very likely to be "extra" (e.g., none of the RPD 112 data (e.g., tuning data) in the view segment has matching panel meter data 122). However, a prediction value of 0.6 is not clearly "matched" or "extra". As a result, a probability threshold is defined to determine that a probability value above a specific threshold x indicates that a data set is "matched", while a probability values below a specific threshold x indicates that the data set is "extra". This allows for the use of data sets which can include missing values or absence of features, since the final probability value will be compared to a threshold probability value to determine whether a given data set is "matched" or "extra". In some examples, the threshold is selected to ensure that the post-model RPD tuning is comparable to national people meter (NPM) tuning. Once the model is trained and the classification probability threshold is selected, the model can be applied to the full set of RPD (e.g., RPD 112). For example, the full set of RPD includes RPD 112 that is derived from STB(s) 103 that are not associated with panel homes (e.g., user(s) 101 are not AME panelists). By training the machine learning algorithm to recognize when a media device is on or off based on common homes data (e.g., meter(s) 107 data and STB(s) 106 return path data), the algorithm can be applied to RPD 112 data to determine whether media device(s) 102 associated with the user(s) 101, who are not panelists, are on or off based on provided return path data 112 associated with STB(s) 103. As such, data assessment of view segments, for example, can be performed using a full set of RPD that includes not only common homes data associated with the STB(s) 106, but also non-panel homes data associated with the STB(s) 103.

The on/off determiner 212 determines whether a media device associated with the reported return path data is on or off. For example, once the trainer 210 has trained the machine learning algorithm as described above, reported return path data (e.g., new return path data provided by the media service provider(s) 110 that the AME 120 has partnered with) is applied to the trained machine learning algorithm. The algorithm predicts a classification of "matched" or "extra" for each viewing segment and each RPD home represented by the reported RPD (e.g., RPD 112 from STB(s) 103 in non-panelist user(s) 101 homes), which translates to predicting whether each viewing segment for each non-panelist RPD home is associated with a media device (e.g., one or more media device(s) 102) that was on or off. For example, a classification of "matched" would indicate that the media device was on, while a classification of "extra" would indicate that the media device was off (e.g., the STB 103 reports RPD 112 that indicates media content was viewed on media device(s) 102, but using the trained algorithm, the on/off determiner 212 can identify that the media device 102 was turned off during the length of time that the RPD 112 reports the media content was viewed, thereby removing this viewing event as a true viewing event). As such, the trainer 210 optimizes the algorithm to predict matching RPD 112 and panel data 122 (e.g., corresponding to a media device 105 being on) or extra RPD 112 data (e.g., corresponding to a media device 105 being off). For example, the algorithm can accept RPD 112 as input and output a prediction based on the RPD 112 once it has been trained to recognize differences between RPD corresponding to media device on/off status. In some examples, the common home RPD 112 input to the algorithm results in an output, such that the trainer 210 compared the prediction generated by the algorithm to corresponding common home panel data (e.g., from meter(s) 107), such that the trainer 210 can train the algorithm to reach a desired level of accuracy in predicting whether a media device is on or off (e.g., media device 105). Therefore, when the on/off determiner 212 receives RPD 112 from non-panel homes (e.g., provided by STB(s) 103), the on/off determiner outputs a "matched" or "extra" prediction, such that the "match" corresponds to the media device 102 being on and the "extra" corresponds to the media device 102 being off. In some examples, the on/off determiner identifies the prediction based on characteristics that the trained algorithm is taught to recognize as being associated with matching panel data. This allows increased accuracy of crediting exposure associated with media output from a STB, given that RPD 112 may not directly provide information concerning the media device(s) (e.g., media device(s) 102) connected to the STB 103 reporting the RPD 112, such as the on/off operating state of a media device connected to the STB 103. For example, media device(s) 102 connected to the STB 103 can be turned off while the STB 103 remains inadvertently or intentionally powered on and outputting media via the media device(s) 102. In some examples, the on/off determiner 212 uses the machine learning algorithm trained using trainer 210 once the classifications being made by the algorithm based on RPD tuning training data set provided by the RPD 112 correlates to tuning provided by a national people meter (NPM) (e.g., by establishing a classification threshold that ensures the RPD tuning data is comparable to data obtained using the NPM).

While an example manner of implementing the media device on/off detector 124 is illustrated in FIGS. 1 and 2, one or more of the elements, processes and/or devices illustrated in FIGS. 1 and 2 may be combined, divided, re-arranged, omitted, eliminated and/or implemented in any other way. Further, the example data storage 202, the example identifier 204, the example classifier 206, the example generator 208, the example trainer 210, the example on/off determiner 212 and/or, more generically, the example media device on/off detector 124 of FIGS. 1-2 may be implemented by hardware, software, firmware and/or any combination of hardware, software and/or firmware. Thus, for example, any of the example data storage 202, the example identifier 204, the example classifier 206, the example generator 208, the example trainer 210, the example on/off determiner 212 and/or, more generically, the example media device on/off detector 124 of FIGS. 1-2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data storage 202, the example identifier 204, the example classifier 206, the example generator 208, the example trainer 210, and/or the example on/off determiner 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media device on/off detector 124 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
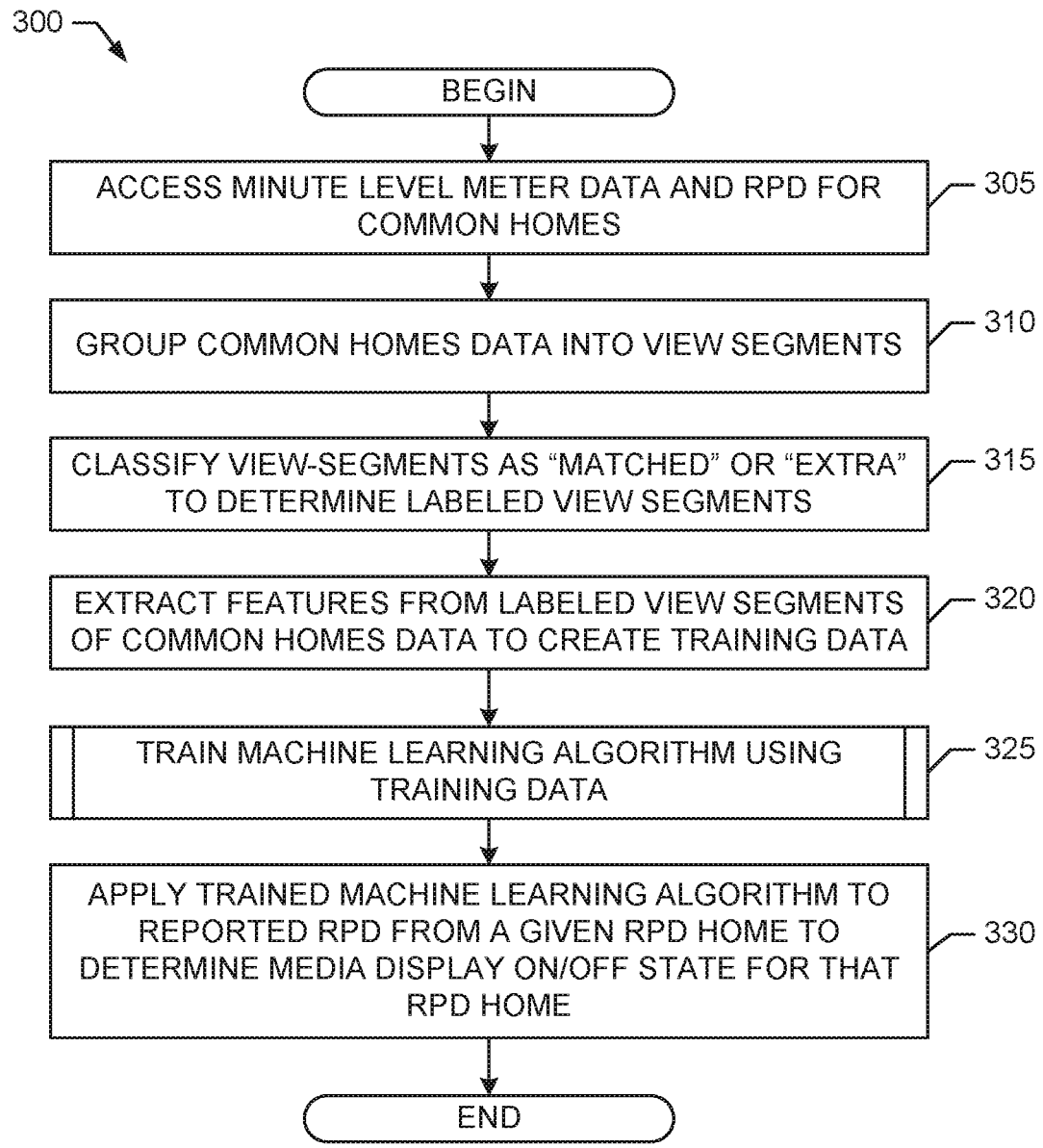
FIG. 3 is a flowchart representative of example computer readable instructions that may be executed to implement the media device on/off detector of FIG. 1 to perform media device on/off detection using return path data in accordance with teachings of this disclosure.
Figure 4:
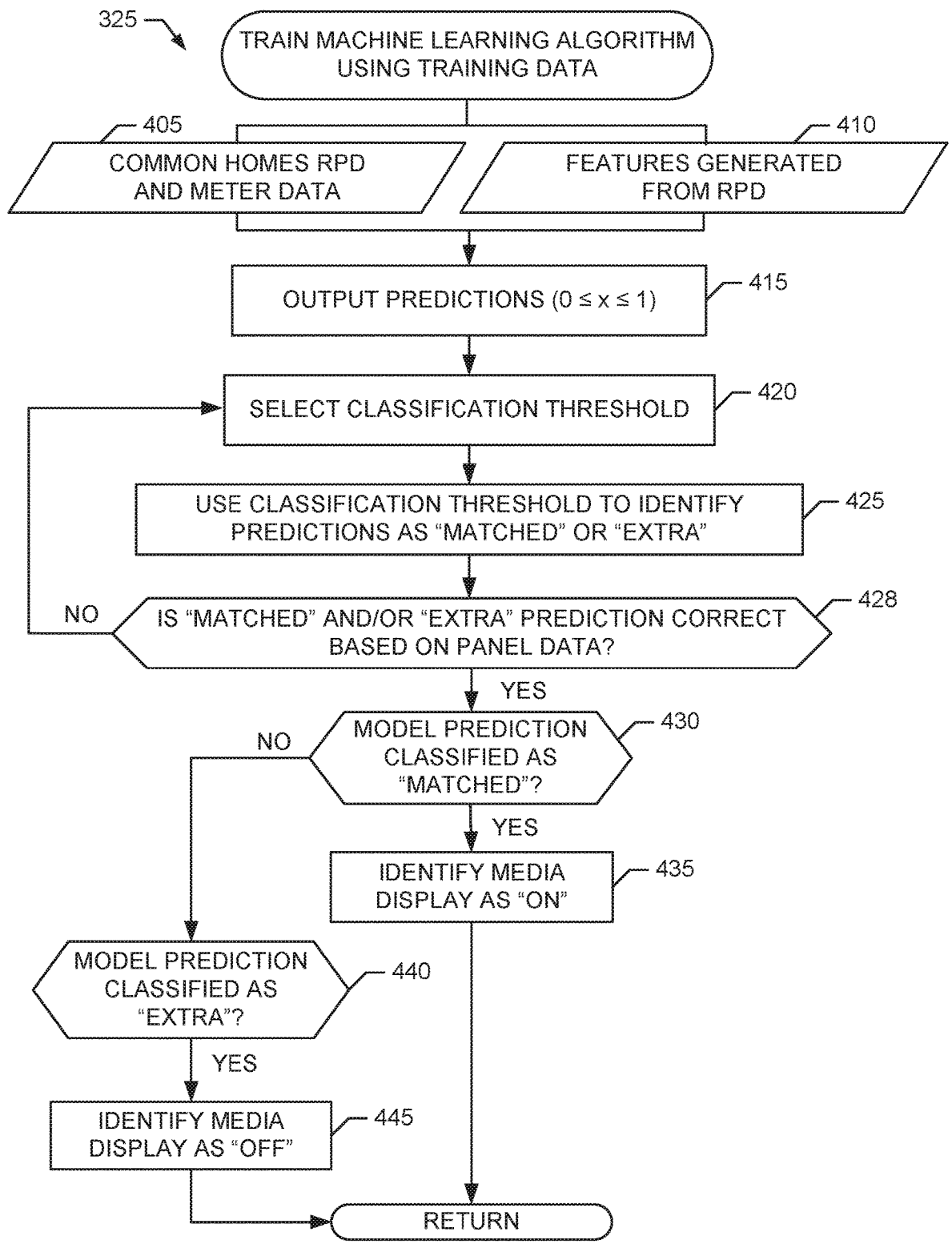
FIG. 4 is a flowchart representative of example computer readable instructions that may be executed by the media device on/off detector to train a machine learning algorithm using return path-based training data.

Flowcharts representative of example hardware logic, machine readable instructions, hardware implemented state machines, and/or any combination thereof for implementing example technical solutions disclosed herein are shown in FIGS. 3-4. In this example, the machine readable instructions may be one or more executable programs or portion(s) of an executable program for execution by a computer processor, such as the processor 712 shown in the example processor platform 700 discussed below in connection with FIG. 7. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 712, but the entire program or programs and/or parts thereof could alternatively be executed by a device other than the processor 712 and/or embodied in firmware or dedicated hardware. Further, although the example program(s) is (are) described with reference to the flowcharts illustrated in FIGS. 3-4, many other methods of implementing the example technical solutions disclosed herein may alternatively be used. For example, with reference to the flowcharts illustrated in FIGS. 3-4, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process(es) of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B. (5) A with C. (6) B with C, and (7) A with B and with C. As used herein in the context of describing structures, components, items, objects and/or things, the phrase "at least one of A and B" is intended to refer to implementations including any of (1) at least one A. (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B.

Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 3 is a flowchart 300 representative of example computer readable instructions that may be executed to perform media device on/off detection using return path data in accordance with teachings of this disclosure. With reference to the preceding figures and associated written descriptions, the example program 300 of FIG. 3 begins execution at block 305, at which the identifier 204 of FIG. 2 accesses RPD 112 and corresponding panel meter data 122 for a group of common homes, which is referred to collectively as common homes data. For example, the identifier 204 can access the data storage 202 to obtain minute-level RPD 112 tuning data and corresponding panel meter 122 viewing data. At block 310, the identifier 204 groups the common homes data into quarter-hour segments referred to as view segments. Thus, at block 310, the identifier 204 splits minute-level RPD tuning for a given common home into quarter hour view segments and links to the corresponding panel meter viewing data for that common home and view segment. At block 315, the classifier 206 classifies the view segments as "matched" or "extra" to determine labeled view segments of common homes data. In this example, the classifier 206 classifies a view segment as "extra" if none of the RPD 112 tuning data in the view segment has matching panel meter 122 viewing data for that view segment. Conversely, the classifier 206 classifies a view segment as "matched" if all of the RPD 112 tuning data in the view segment has matching panel meter 122 viewing data for that view segment. In some examples, the classifier 206 can group the common home data into view segments of 15 minute durations, which results in almost all of the view segments being classified as "matched" or "extra," with relatively few view segments being partially "matched" or partially "extra." In some examples, at block 315, the classifier 206 classifies the view segments that are partially "matched" or partially "extra" as "matched."

At block 320, the generator 208 generates features from the labeled view segments (e.g., based on the RPD 112 tuning data and possibly other available RPD included in the labeled view segments) to determine training data to be used to train a machine learning algorithm (e.g., such as a random forest, a neural network, etc.) to predict whether an input view segment of RPD 112 tuning data would likely be classified as "matched" (and, thus, would likely be associated with a media device that is on), or would likely be classified as "extra" (and, thus, would likely be associated with a media device that is off). Example features generated by the generator 208 from the labeled view segments include, but are not limited to: day of month, viewsegment index, viewsegment duration, event duration, minutes since event start, event type, number of events a household has in a day, etc. Other features that may be generated from the labeled view segments include, but are not limited to: household id, device id, event type (live, dvr, etc.), playback delay, station code, etc. In some examples, the feature selections are based on an evaluation of the percentage of "matched" view segments and percentage of "extra" view segments removed, such that some features may not be included if their use results in overfitting (e.g., the training data is modeled too well, such that learning the details and noise in a training set of data by the model causes a negative impact on the performance of the model when a new set of data is applied). In some examples, the model can be trained on at least one month (or some other monitoring interval) of common homes data prior to applying the model to reported return path data from a given common home to determine a media display on/off state. In some examples, the model can be re-trained and tested each month (or some other rate).

At block 325, the trainer 210 uses training data generated at block 320 to iteratively train and tune the machine learning algorithm (e.g., the random forest, the neural network, etc.) implemented by the on/off determiner 212. The machine learning algorithm outputs predictions that classify an input view segment of RPD 112 tuning data into one of 2 labels, namely, "matched" (corresponding to a decision that the media device 105 associated with the input view segment of RPD 112 tuning data was on) or "extra" (corresponding to a decision that the media device 104 associated with the input view segment of RPD 112 tuning data was off). In some examples, the trainer 210 uses one or more thresholds to transform probability values output from the machine learning algorithm into "matched" or "extra" classifications, with the threshold(s) being tuned to meet one or more performance targets. At block 330, the trainer 210 applies reported RPD from RPD homes (e.g., which are not common homes) to the trained machine learning algorithm (e.g., the random forest, the neural network, etc.), which predicts a classification of "matched" or "extra" for each viewing segment and each RPD home represented by the reported RPD, which translates to predicting whether each viewing segment for each RPD home is associated with a media device that was on or off.

FIG. 4 is a flowchart 325 representative of example computer readable instructions that may be executed by the media device on/off detector 124 to train a machine learning algorithm using return path-based training data. Using common homes return path data and panel meter data accessed by the identifier 204 (represented by block 405) and the features generated from the return path data by the generator 208 (represented by block 410), the trainer 210 trains the model such that the model outputs predictions (e.g., numbers 0-1) (block 415). The trainer 210 classifies the model predictions as either "extra" or "matched" using a classification threshold. In some examples, the classification threshold is selected to allow the trainer 210 to train the algorithm such that the final "matching" predictions are correlated to the NPM common homes tuning data that can be used as a reference during the training process (block 420). In some examples, the classification threshold can be selected such that the post-model RPD common homes tuning is not greater than 20% when compared to NPM common homes tuning as a reference. The trainer 210 uses the classification threshold to identify the model predictions as "matched" or "extra" (block 425). For example, if the model used is based on a random forest machine learning algorithm, a probability value of 0.995 (or some other relatively high probability value) returned by the model is likely to be a "matched" view segment, whereas a probability value of 0.004 (or some other relatively low probability value) predicts that a data set is very likely to be "extra" (e.g., none of the RPD 112 data (e.g., tuning data) in the view segment has matching panel meter data 122). However, a prediction value of 0.6 (or some other probability value relatively close to 0.5) is not clearly "matched" or "extra", thereby requiring the use of a threshold to determine how such a probability value should be classified. In some examples, the classification threshold can be adjusted based on whether the "matched" and/or "extra" prediction is correct when compared to panel meter data 122 derived from a panel home that is part of the common homes data used during algorithm training (block 428). The classification threshold is established such that there is a high level of accuracy in the algorithm being able to predict whether a media device is on or off (e.g., algorithm accurately identifies the media device status). If a model prediction is classified as "matched" based on the model output (block 430), the trainer 210 identifies the media display status as "on" (block 435). If the model prediction is classified as "extra" (block 440), the trainer 210 identifies the media display status as "off" (block 445). In some examples, the resulting trained data outputs by the model identifying the media device as on or off are compared to NPM data to identify whether the classification threshold should be adjusted (e.g., ensuring post-model RPD common homes tuning is not more than 20% greater than NPM common homes tuning, while also minimizing the amount of matched tuning removed). Once the training cycle is complete according to the example instructions of FIG. 4, the media device on/off detector 124 uses the on/off determiner 212 to determine a media display on/off state for a given RPD home based on the trained machine learning algorithm.

FIGS. 5A-5B include example validation metrics indicating the media device on/off status determination using the techniques described herein using common homes return path data and panel meter data result in improved accuracy when compared to a reference on/off determination technique. In the example table 500 of FIG. 5A, three broadcast service providers are shown with example amount of "extra" tuning percentage (%) removed and "matched" tuning percentage (%) removed when comparing a non-machine learning algorithm trained data set (e.g., prod) with a machine learning algorithm trained data set (e.g., new). For example, return path data (e.g., return path data 112) captures STB tuning (e.g., STB 106), but does not reveal when the media device (e.g., television) is on or off. Therefore, modeling the on/off times using the machine learning algorithm trained data set ensures that tuning is not inflated. In the example of table 500, the percentage of tuning designated as "extra" (e.g., television off) that is removed when compared to the percentage of tuning designated as "matched" (e.g., television on) that is removed is evaluated for each of the three example broadcast service providers (e.g., 510, 520, and 530). For broadcast service provider 510, the trained model results in a greater percentage of "extra" tuning removed (e.g., 52% compared to 43%), and a decrease in the percentage of "matched" tuning removed (e.g., 15% compared to 21%). In some examples, the percentage of "extra" tuning removed may not increase significantly, but the percentage of "matched" tuning removed decreases significantly. For example, for broadcast service provider 520, use of the trained model results in a slight increase of the "extra" tuning removed (e.g., 71% compared to 70%), and an overall decrease in the percentage of "matched" tuning removed (e.g., 12% compared to 25%). Likewise, in the example of broadcast service provider 530, the "extra" tuning removed decreases slightly (e.g., from 78% to 75%), but the "matched" tuning removed decreases significantly (e.g., from 36% to 18%). Therefore, the trained model enables, in some examples, a greater percentage of "extra" tuning to be removed (e.g., new on/off model for broadcast service provider 510), such that a greater number of common homes that are identified to have the media turned off (e.g., designated as "extra" tuning) are removed from the overall tuning data, while in the examples presented in FIG. 5A (e.g., new on/off model for broadcast service providers 510, 520, and 530), the "matched" tuning percentage removed decreases, indicating that more data can be included in the tuning counts since the "matched" data indicates that return path data and panel meter data for the common homes confirms that the media device (e.g., television) is on, allowing the tuning data to be included in the total counts. This permits the tuning data to be more accurate, reliable, and representative of the common homes media device use.

In the example table 550 of FIG. 5B, a prior on/off model (e.g., not using a machine learning-based training algorithm) and an on/off model using the machine learning-based training algorithm described herein (e.g., designated as new on/off model) are compared against a currency measurement (e.g., established method of audience measurement, such as a measurement from a set meter and/or a code meter, but not including RPD). For example, the training employed for the on/off model is accordance with the methods disclosed herein is intended to improve the accuracy of the model, which can be measured against a reference (e.g., currency determined using national people meter (NPM) panel data). For example, the model results can be compared to data obtained using a set meter and/or a code reader for a household rating 555 and a persons-based rating 585 (e.g., specific to a demographic, such as persons between 18-24 years of age, persons between 25-54 years of age, and persons 55 and older). In the example table 550, the comparison is between a currency measurement 560 and either a prior on/off model 565 or a new on/off model 570, thereby yielding a prior model versus currency comparison 575 and a new model versus currency comparison 580. For the set meter data and the code reader data, the new on/off model (e.g., using a machine learning-based training algorithm) improves the accuracy of results for the household ratings 555 (e.g., based on data science validation and analyses). For example, when compared to currency obtained using a set meter and a code reader, the percent differences between tuning data when comparing the new model versus currency are lower (e.g., 0.2% and −0.7%) than when comparing the prior model versus currency (e.g., −0.6% and −1.6%). For persons-specific rating 585, comparison data using a set meter for the non-machine learning trained model (e.g., −3.4%, −3.3%, and −0.6%) has a higher percentage of difference from the currency measurement, as compared to the algorithm-trained model (e.g., −2.9%, −2.7%, and 0%). Likewise, comparison data using a code meter for the non-machine learning trained model (e.g., −3.2%, −5.9%, and −1.1%) also has a higher percentage of difference from the currency measurement, as compared to the algorithm-trained model (e.g., −2.7%, −5.1%, and −0.4%). In some examples, the data accuracy can increase depending on other variables, such as the frequency of channel changes (e.g., measurements for household ratings with no channel change for 3 or more hours can be more accurate).

Figure 6A:
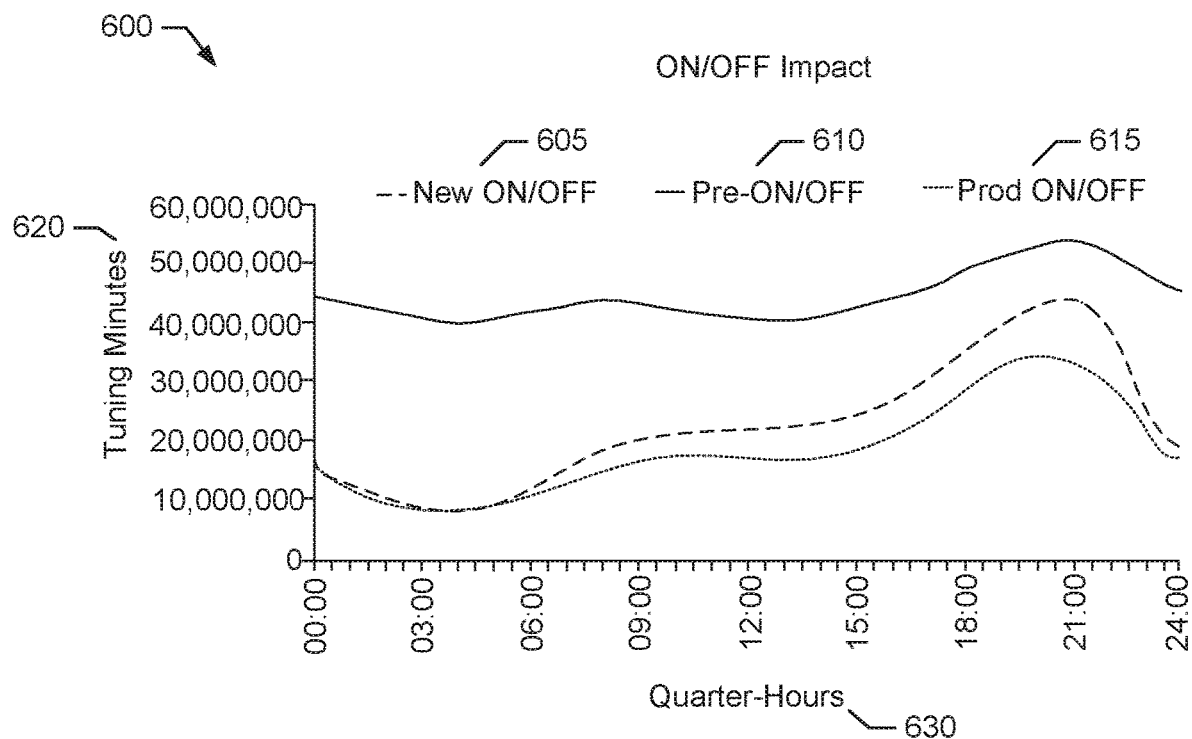
FIGS. 6A-6B include examples of changes in tuning minutes and percentage of tuning minutes remaining when using an example machine learning algorithm trained based on common homes return path data and panel meter data in accordance with teachings of this disclosure.
Figure 6B:
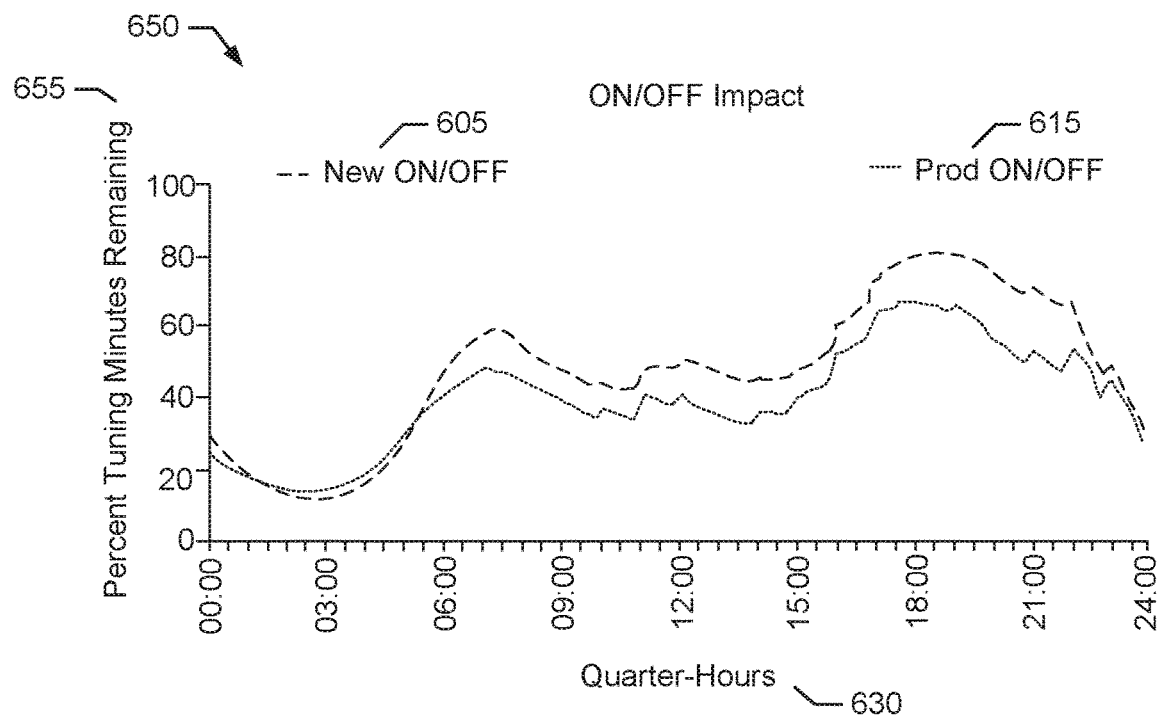

FIGS. 6A-6B include examples of changes in tuning minutes and percentage of tuning minutes remaining when using the machine learning-based training algorithm described herein based on common homes return path data and panel meter data. FIG. 6A includes a graph 600 of tuning minutes 620 recorded for households in a given data for a set of quarter hours 630, including data using a pre-on/off model 610 (e.g., a model not including return path data), a product on/off model 615 (e.g., a model not including a machine learning-based training algorithm), and a new on/off model 605 (e.g., a model including the return path data and training using a machine learning-based algorithm). The number of tuning minutes counted is much higher per quarter hour when using a pre-on/off model 610 (e.g., not including return path data) when compared to the product 615 and new 605 on/off models. Overall, there is a higher number of tuning minutes counted using a machine learning-trained model with return path data as compared to when return path data is used without the additional training (e.g., product on/off model 615), other than for a period in the early morning when the tuning minute readings are almost identical. The training aspect of the algorithm for the new on/off model allows improved accuracy of the tuning minute counts without elimination of minutes that should otherwise be incorporated into the quarter-hours tuning minute counts. As further shown in graph 650 of FIG. 6B, the percentage of tuning minutes remaining 655 is lower for the on/off model 615 not including the machine-learning based training compared to the on/off model 605 that includes such training based on the return path data and panel meter data. For example, using the new on/off model 605, the percent tuning minutes remaining is higher, such that a greater number of the original tuning minutes provided by a reference assessment (e.g., national people meter data) is used, compared to the number of minutes available when using a non-trained model 615. Overall, the impact of the on/off model can vary depending on the broadcast service provider and may need to be evaluated separately for each provider to determine how well a given model applies.

Figure 7:
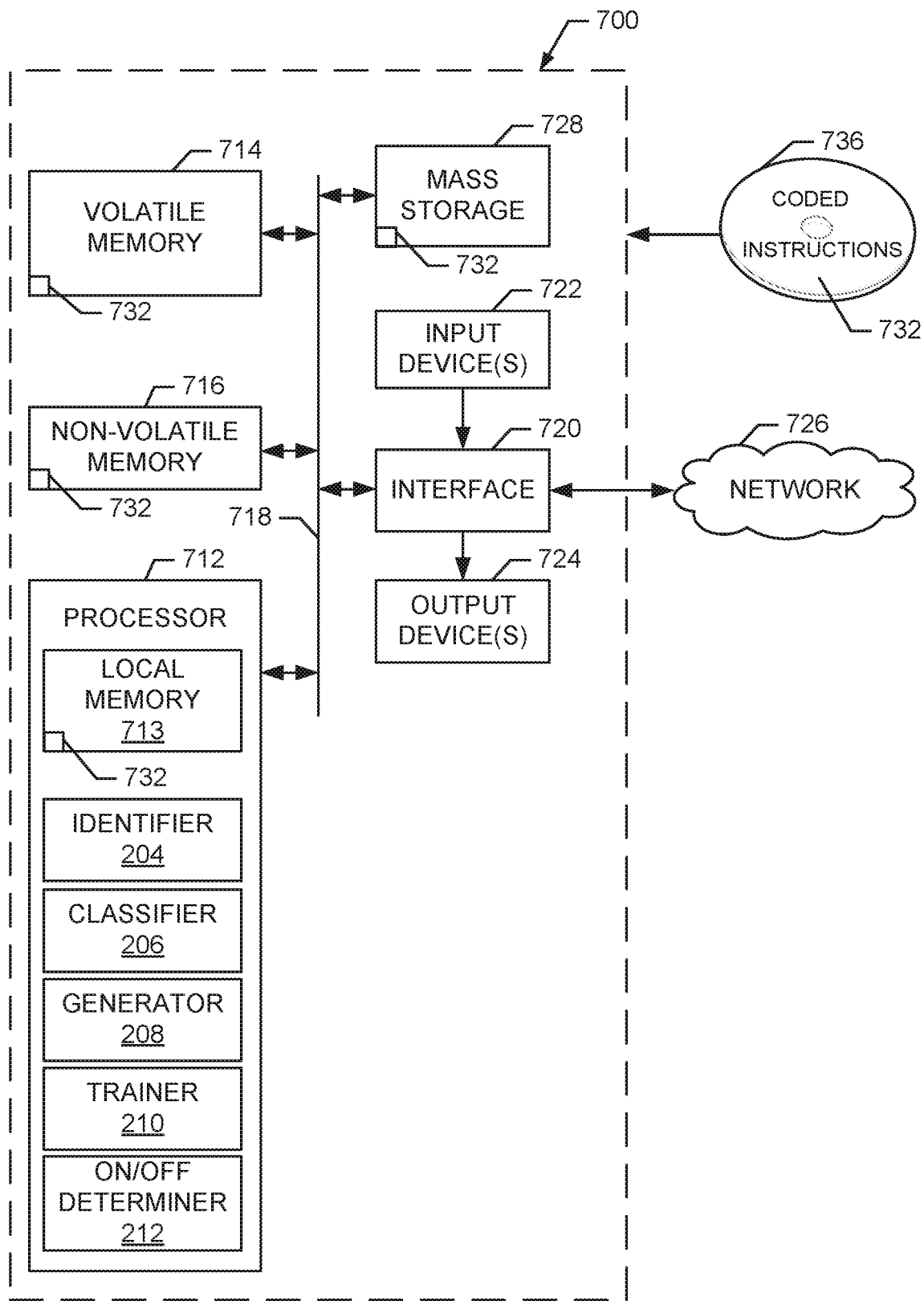
FIG. 7 is a block diagram of an example processor platform structured to execute the example computer readable instructions of FIGS. 3 and/or 4 to implement the media device on/off detector of FIGS. 1 and/or 2.

FIG. 7 is a block diagram of an example processor platform structured to execute the example computer readable instructions of FIGS. 3-4 to implement the example media device on/off detector 124 of FIGS. 1-2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor 712 may be a semiconductor based (e.g., silicon based) device. In this example, the processor 712 implements the example identifier 204, the example classifier 206, the example generator 208, the example trainer 210, and/or the example on/off determiner 212 of FIG. 2.

The processor 712 of the illustrated example includes a local memory 713 (e.g., a cache). The processor 712 of the illustrated example is in communication with a main memory including a volatile memory 714 and a non-volatile memory 716 via a link 718. The link 718 may be implemented by a bus, one or more point-to-point connections, etc., or a combination thereof. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 700, can allow the user to control the computer system and provide data to the computer using physical gestures, such as, but not limited to, hand or body movements, facial expressions, and face recognition.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 corresponding to the instructions of FIGS. 3-4 may be stored in the mass storage device 728, in the volatile memory 714, in the non-volatile memory 716, in the local memory 713 and/or on a removable non-transitory computer readable storage medium, such as a CD or DVD 736.

From the foregoing, it will be appreciated that example systems, methods, and apparatus allow for the prediction of the on/off operating state of a media device connected to a set top box (STB) from return path data (RPD) reported by that set top box. Disclosed example technical solutions leverage common homes data to train one or more machine learning algorithms, such as a random-forest, a neural network, etc., to predict the operating state of media devices connected to STBs from features extracted from RPD reported from those STBs. The meter data for each common homes is linked to the RPD from that same home to yield training RPD that either has matching panel meter viewing data (e.g., media device viewing data), which indicates the media device in that common home was on, or that doesn't have any matching meter viewing data, which indicates the media device in that common home was off. In the examples disclosed herein, the training RPD is used to train the machine learning algorithm to predict whether the training RPD for a given common home has matching meter data (corresponding to a media device on state) or does not have matching meter data (corresponding to a media device off state). Disclosed example technical solutions then employ the trained machine learning algorithm to process RPD reported from an STB to predict whether a media device connected to that STB is on or off.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system to perform media device on/off detection, the computing system comprising:
a processor; and
a non-transitory computer-readable storage medium, having stored thereon program instructions that, upon execution by the processor, cause performance of a set of operations comprising:
obtaining, from a media service provider, first return path data including a portion of the first return path data from at least one set-top box (STB) in a plurality of common homes, wherein each common home of the plurality of common homes includes a respective STB coupled to a respective media device and a respective meter coupled to the respective media device;
accessing, at data storage of an audience measurement entity (AME), the first return path data and panel meter data obtained from the respective meters of the plurality of common homes;
classifying view segments associated with at least one common home of the plurality of common homes as common homes data based on whether first return path data in respective ones of the view segments matches the panel meter data to determine labeled view segments;
training a machine learning algorithm, based on a first set of features, to output on/off determinations for media devices, the first set of features generated from the labeled view segments;
obtaining, from the media service provider, second return path data;
applying second return path data to the machine learning algorithm trained based on the first set of features to output a first on/off determination associated with a media device represented in the second return path data;
further training the machine learning algorithm based on a second set of features, the second set of features generated from the labeled view segments; and
applying the second return path data to the machine learning algorithm trained based on the second set of features to output a second on/off determination associated with the media device represented in the second return path data.

2. The computing system of claim 1, wherein the machine learning algorithm is to classify the media device associated with the second return path data as on based on a classification probability threshold.

3. The computing system of claim 2, wherein the machine learning algorithm is to predict whether the media device represented in the second return path data would have matching panel meter data based on the classification probability threshold.

4. The computing system of claim 1, wherein the operations further comprising: generating a view segment index or a view segment duration, the view segment index corresponding to where in a tuning event the view segment occurs.

5. The computing system of claim 1, wherein the operations further comprising: accessing, at the data storage of the AME, the common homes data for the plurality of common homes, the common homes data including the first return path data and the panel meter data.

6. The computing system of claim 5, wherein the operations further comprising: grouping the common homes data into view segments based on quarter hour segments.

7. The computing system of claim 1, wherein the media device represented in the second return path data different than any of the respective media devices of the plurality of common homes.

8. A method to perform media device on/off detection using return path data, comprising:
obtaining, from a media service provider, first return path data including a portion of the first return path data from at least one set-top box (STB) in a plurality of common homes;
accessing, at data storage of an audience measurement entity (AME), the first return path data and panel meter data obtained from respective meters of the plurality of common homes;
classifying view segments associated with at least one common home of the plurality of common homes as common homes data based on whether first return path data in respective ones of the view segments matches the panel meter data to determine labeled view segments;
training a machine learning algorithm, based on a first set of features, to output on/off determinations for media devices, the first set of features generated from the labeled view segments;
obtaining, from the media service provider, second return path data;
applying second return path data to the machine learning algorithm trained based on the first set of features to output a first on/off determination associated with a media device represented in the second return path data;
further training the machine learning algorithm based on a second set of features, the second set of features generated from the labeled view segments; and
applying the second return path data to the machine learning algorithm trained based on the second set of features to output a second on/off determination associated with the media device represented in the second return path data.

9. The method of claim 8, wherein the machine learning algorithm is to classify the media device associated with the second return path data as on based on a classification probability threshold.

10. The method of claim 9, wherein the machine learning algorithm is to predict whether the media device represented in the second return path data would have matching panel meter data based on the classification probability threshold.

11. The method of claim 8, further including generating a view segment index or a view segment duration, the view segment index corresponding to where in a tuning event the view segment occurs.

12. The method of claim 8, further including accessing, at the data storage of the AME, the common homes data for the plurality of common homes, the common homes data including the first return path data and the panel meter data.

13. The method of claim 12, further including grouping the common homes data into view segments based on quarter hour segments.

14. The method of claim 13, wherein the media device represented in the second return path data different than any of the respective media devices of the plurality of common homes.

15. A non-transitory computer readable storage medium comprising computer readable instructions to cause one or more processors to at least:
- obtain, from a media service provider, first return path data including a portion of the first return path data from at least one set-top box (STB) in a plurality of common homes;
- access, at data storage of an audience measurement entity (AME), the first return path data and panel meter data obtained from respective meters of the plurality of common homes;
- classify view segments associated with at least one common home of the plurality of common homes as common homes data based on whether first return path data in respective ones of the view segments matches the panel meter data to determine labeled view segments;
- train a machine learning algorithm, based on a first set of features, to output on/off determinations for media devices, the first set of features generated from the labeled view segments;
- obtain, from the media service provider, second return path data;
- apply second return path data to the machine learning algorithm trained based on the first set of features to output a first on/off determination associated with a media device represented in the second return path data;
- further train the machine learning algorithm based on a second set of features, the second set of features generated from the labeled view segments; and
- apply the second return path data to the machine learning algorithm trained based on the second set of features to output a second on/off determination associated with the media device represented in the second return path data.

16. The storage medium of claim 15, wherein the machine learning algorithm is to classify the media device associated with the second return path data as on based on a classification probability threshold.

17. The storage medium of claim 16, wherein the machine learning algorithm is to predict whether the media device represented in the second return path data would have matching panel meter data based on the classification probability threshold.

18. The storage medium of claim 15, wherein the instructions, when executed, further cause the one or more processors to generate a view segment index or a view segment duration, the view segment index corresponding to where in a tuning event the view segment occurs.

19. The storage medium of claim 18, wherein the instructions, when executed, further cause the one or more processors to access, at the data storage of the AME, the common homes data for the plurality of common homes, the common homes data including the first return path data and the panel meter data.

20. The storage medium of claim 19, wherein the instructions, when executed, further cause the one or more processors to group the common homes data into view segments based on quarter hour segments.

* * * * *